(12) United States Patent
Bhimireddy et al.

(10) Patent No.: US 11,521,086 B2
(45) Date of Patent: Dec. 6, 2022

(54) SOFTWARE NAVIGATION CRASH PREDICTION SYSTEM

(71) Applicant: Bank of America Corporation, Charlotte, NC (US)

(72) Inventors: Venkata R. Bhimireddy, Charlotte, NC (US); Sandeep Verma, Haryana (IN); Srinivas Dundigalla, Charlotte, NC (US); Pavan Chayanam, San Francisco, CA (US)

(73) Assignee: Bank of America Corporation, Charlotte, NC (US)

( * ) Notice: Subject to any disclaimer, the term of this patent is extended or adjusted under 35 U.S.C. 154(b) by 280 days.

(21) Appl. No.: 16/890,224

(22) Filed: Jun. 2, 2020

(65) Prior Publication Data
US 2021/0374567 A1    Dec. 2, 2021

(51) Int. Cl.
| | | |
|---|---|---|
| *G06F 11/00* | (2006.01) | |
| *G06N 5/04* | (2006.01) | |
| *G06N 20/00* | (2019.01) | |
| *G06F 11/34* | (2006.01) | |
| *G06F 11/30* | (2006.01) | |

(52) U.S. Cl.
CPC .............. *G06N 5/04* (2013.01); *G06F 11/004* (2013.01); *G06F 11/3006* (2013.01); *G06F 11/3495* (2013.01); *G06N 20/00* (2019.01)

(58) Field of Classification Search
CPC ............. G06F 11/0706; G06F 11/0709; G06F 11/0736; G06F 11/3006; G06F 11/34; G06F 11/3438; G06F 11/3447; G06F 11/3457; G06F 11/3476; G06F 11/3495; G06F 11/3636
See application file for complete search history.

(56) References Cited

U.S. PATENT DOCUMENTS

| | | |
|---|---|---|
| 8,516,308 B1 | 8/2013 | Gill et al. |
| 9,069,737 B1 * | 6/2015 | Kimotho ............. G06F 11/0709 |
| 9,519,869 B2 | 12/2016 | Hwang |
| 10,013,334 B1 | 7/2018 | Carey et al. |
| 10,289,509 B2 * | 5/2019 | Xu ...................... G06N 3/0445 |
| 10,599,506 B2 * | 3/2020 | Cohen .................... G06N 20/00 |
| 11,010,232 B2 * | 5/2021 | Udayaadithya ......... G06F 9/547 |
| 2010/0088546 A1 | 4/2010 | Chilimbi et al. |
| 2012/0166869 A1 * | 6/2012 | Young ................... G06F 11/079 |
| | | 714/15 |
| 2018/0113773 A1 * | 4/2018 | Krishnan .............. G06F 11/079 |

(Continued)

*Primary Examiner* — Elmira Mehrmanesh
(74) *Attorney, Agent, or Firm* — Banner & Witcoff, Ltd.

(57) ABSTRACT

A crash prediction computing system includes a machine learning module capable of analyzing data logs associated with each of a plurality of services or applications to identify and categorize every error, exception, and/or crash, such as those resulting from client system interactions based on crash type, customer profile type, customer screen navigation flow, time or crash. The machine learning algorithms continuously train the crash prediction models for each crash category with associated client computing system navigation flow. The crash prediction computing system applies each model before each screen/activity navigation to predict whether the next move will result in an error, exception or crash, and for each predicted error, exception, or crash, automatically implement alternate route functionality to arrive at a desired target.

17 Claims, 4 Drawing Sheets

(56) References Cited

U.S. PATENT DOCUMENTS

| | | | |
|---|---|---|---|
| 2019/0095313 A1* | 3/2019 | Xu | G06F 11/008 |
| 2019/0138325 A1* | 5/2019 | Chen | G06F 9/4451 |
| 2019/0347148 A1* | 11/2019 | Gomes Pereira | G06K 9/623 |
| 2019/0377622 A1* | 12/2019 | Kurian | G06F 11/0775 |
| 2020/0097389 A1* | 3/2020 | Smith | G06F 11/3612 |

\* cited by examiner

SOFTWARE NAVIGATION CRASH PREDICTION SYSTEM

TECHNICAL FIELD

This disclosure pertains to monitoring operations of networked applications and/or services. A crash prediction system utilizes machine learning and/or artificial intelligence to monitor operation of networked applications and/or services when accessed through a client system to predict whether a next initiated action results in an expected result or an unexpected result and to automatically mitigate the unexpected result conditions.

BACKGROUND

Organizations and/or individuals provide products and/or services via online resources and applications, such as via web interfaces and/or network enabled applications to users via networked user devices. For example, a user device may connect to a business organization's network via a communication network (e.g., a telecommunication network, the Internet, a wide area network, a local area network, and the like). In many cases, a crash may occur in production due to a pattern of navigation, user or system data, application versions, operating system versions, hardware types and versions and the like. Often, an application or service may provide multiple routes (e.g., a navigation path between a starting user interface screen and a destination user interface screen) to allow a user to access desired features of the accessed application or service. In some cases, such actions may result in expected user navigation. In other cases, some paths may result in a crash, or other error situation. Such results may be dependent upon a particular client system connection, which may include navigation flow, data accessed, application versions, product versions, hardware versions, operating system versions, and/or the like. Unfortunately, present systems are unable to predict whether a user's next initiated action in a navigation flow would result in a safe action (e.g., an expected result) or an error condition (e.g., a system crash).

SUMMARY

The following summary presents a simplified summary of certain features. The summary is not an extensive overview and is not intended to identify key or critical elements.

In some cases, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a machine learning system capable of analyzing data logs associated with each of a plurality of services or applications to identify for every error, exception, and/or crash, such as those resulting from client system interactions. A crash prediction computing system may categorize the error, exception, or crash based on crash type, customer profile type, customer screen navigation flow, time or crash, and the like and may use one or more machine learning algorithm to continuously train the crash prediction model for crash category, and may build a model (e.g., a finite automata model) for each crash category with associated client computing system navigation flow. The crash prediction computing system may apply a machine learning (ML) finite automata model before each screen/activity navigation to determine whether the next move may result in an error, an exception or a crash. For each predicted error, exception, or crash, the crash prediction computing system may automatically implement alternate routs to move through alternative routes to the target.

These and other features and advantages are described in more detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
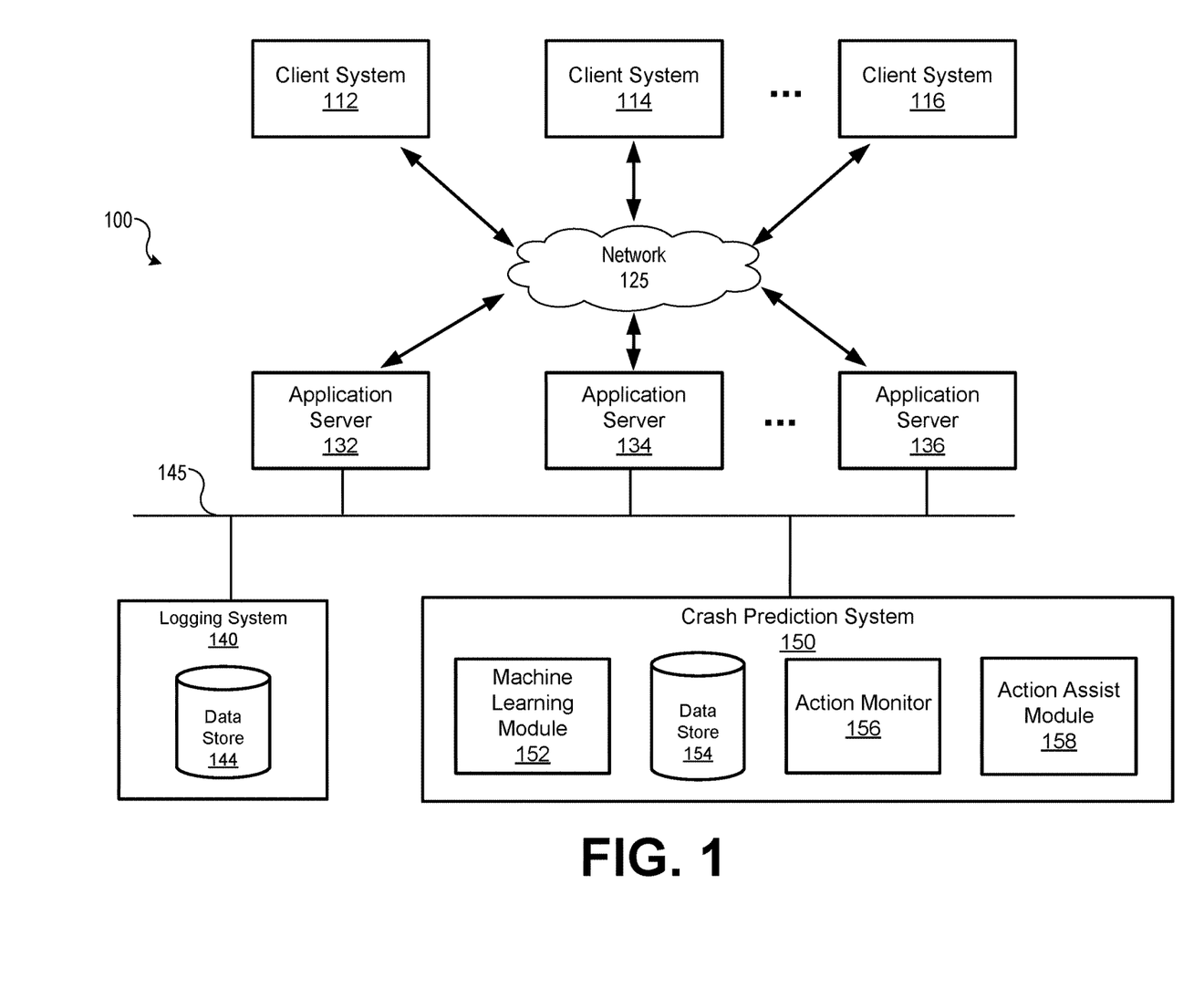
FIG. 1 shows an illustrative crash prediction computing system in accordance with aspects of this disclosure.

FIG. 1 shows an illustrative crash prediction computing system 100 in accordance with aspects of this disclosure. For example, the crash prediction computing system 100 may include one or more client computing systems (e.g., a client computing system 112, a client computing system 114, a client computing system 116, and the like) communicatively coupled via a network 125 to one or more computing systems providing a network accessible product or service, such as an application server 132, an application server 134, and an application server 136. The application servers (e.g., the application server 132, the application server 134, the application server 136) may be communicatively coupled to one or more computing devices, such as via an enterprise computing network 145, to a logging system 140 and/or a crash prediction system 150. In some cases, the logging system may include one or more data logs, such as the data store 144. The crash prediction system 150 may include a machine learning module 152, a data store 154, an action monitor 156 and/or an action assist module 158.

Organizations may provide products and/or services via the network 125, such as via the Internet (e.g., via a webpage interface), via an application accessed via a computing device (e.g., a mobile application), and/or via a networked computing device. In an illustrative case, an application may be used to allow a user to access an account (e.g., a user financial account) and perform a number of actions (e.g., an online bill pay application, an online loan application process, and the like). Such actions may be performed via one or more different application servers providing a functionality or a portion of a functionality. In some cases, crashes and, or error conditions may appear in production with some similarity in pattern of data, navigation and/or time of day. In some cases, applications may offer multiple routes (e.g., web pages, application interfaces, and the like) to reach to a target screen and/or operation and it may be observed that not all the routes to the target screen run into an error condition, exception, and/or a crash, and only a subset of actions and/or routes may result in crashes. As such, the crash prediction computing system 150 may utilize one or more trained machine learning models to predict whether a next move of customer activity will result in a crash or error condition or not, based, at least in part, on customer profile data, navigation flow, a current time and/or the like. For example, the crash prediction computing system 150 may predict a crash probability or likelihood based on customer data, navigation and time using a machine learning algorithm and a finite automata state machine.

In some cases, a client system 112 may be a user device, such as a personal computer, a mobile device (e.g., a smart phone, a laptop, and the like), an enterprise computing system (e.g., a workstation, an automated teller machine, a kiosk computing system), and/or the like. The client system 112, for example, may be a user device accessing a product or service offered by an organization via a web interface. In such cases, the product or service may be provided via functionality (e.g., an application, a web service, and the like) provided via one or more application services. For example, a first application server (e.g., application server 132) may provide a user login functionality, a second application server (e.g., the application server 134) may provide user account management functionality) and a third application server (e.g., the application server 136) may provide a service (e.g., an electronic bill pay service) based on interaction with the first two application servers, such as by providing subscribed services to a user based on a successful login and activated features associated with the user's account.

Operation of each server during each step in the process accessed by the client system may be logged by the logging system 140. For example, an error condition, an exception condition, a system crash condition may be logged and stored in the data store 144. In some cases, the logging system may be a centralized process implemented in a computing system (e.g., a data logging server), a decentralized process implemented in each application server 132, or a combination. In an illustrative example, when an error condition, exception, or system crash condition occurs, the logging system may log a time of error, a navigation history associated with the user's access in a number of steps leading up to the condition, network traffic loading information, server workload information, application version information, operating system information, hardware information, and the like. The logging system 140, may log a history of user navigation leading up to the exception condition, where the logging system may store information associated with the request resulting in the crash, an executed action resulting in showing a user interface screen to a user that includes the option to request the action that resulted in a crash, and the like. In some cases, the logging system 140 may log a full navigation history (e.g., calls or requests for particular functionality to be performed by an application server) of the client system from connection to the exception. The logging system 140 may not store any user-specific and/or user identifying information and may store application calls, successful and/or unsuccessful.

The crash prediction computing system 140 may analyze, by the machine learning module 152, data logged by the logging system 140 and stored in the data store 144, such as information corresponding to each logged error, exception, and/or crash corresponding to application server operation. Each error, exception, and/or crash may be categorized based on an error type, a customer profile time, a navigation flow of accessed functionality, and/or time of day of the error, exception and/or crash. In some cases, the categorization may also be based on a device type, an application version running on each application server associated with the functionality causing the error, exception and/or crash, information corresponding to the involved hardware, operating system information, network traffic information, network loading information, server loading information and the like.

The machine learning module may use one or more machine learning algorithms to train an error, exception and/or crash prediction model or models for each crash category. Machine learning has enabled the automated processing of problems formerly limited to human intervention. Traditionally, computers have been explicitly programmed to perform tasks, meaning that even fairly simple tasks can take significant amounts of programming time to implement. Machine learning may be used to allow a computer to perform the same or similar tasks without being explicitly programmed to do so. For example, where formerly a programmer may have manually programmed an error handling system (e.g., providing code telling a computer to look for expected error conditions and provide a specific response based on each particular error or error type), machine learning may be used instead by providing a computer with a large set of network operation data (e.g., system logs, error logs, a navigation map of a web site or application service) and rewarding the computer for correct identifications of error conditions over repeated trials. Colloquially, such methods may be said to allow a machine learning algorithm to both think and learn.

A framework for machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator. An embodiment involving unsupervised machine learning is described herein.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess regarding whether a user action will result in a crash, analyze one or more data logs for similar situation and/or computing conditions, and compare the guess and the data logs and user interaction. In semi-supervised learning, a machine learning algorithm is provided a set of example labels along with unlabeled data. For example, the machine learning algorithm may be provided a data set of a first number of error, crash or exception conditions with assigned categories assigned and a second number of random, unlabeled error conditions. In reinforcement learning, a machine learning algorithm is rewarded for correct categorization, allowing it to iteratively observe conditions until rewards are consistently earned. For example, for every error, exception, or crash category correctly identified, the machine learning algorithm may be given a point and/or a score (e.g., "75% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In an illustrative example, the system may use machine learning to determine an output. The output may include anomaly scores, heat scores/values, confidence values, and/or classification output. The system may use any machine learning model including xgboosted decision trees, autoencoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training a neural network, the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alternatively, an optimization function may minimize the number of missed positives to optimize minimization of losses from exploits.

One or more machine learning models may be associated with one or more devices or a class of devices (e.g., client computing system devices, application servers, and the like). Different computing devices may be involved with other entities in different ways: for example, a first computing device may access a second computing device and/or be accessed by the second computing device. As such, different machine learning models may be developed for different types of computing devices (e.g., smartphone, personal computer), different ways in which computing devices communicate (e.g., devices using cellular communications, devices using Ethernet cables), different ownership profiles of computing devices (e.g., public computers, workplace computers, personal computers located in a home), and the like.

Multiple machine learning models may be used together to make decisions. The output of one machine learning model may be used as the input of another machine learning model, and/or multiple machine learning models may execute in parallel, such that decision-making may comprise the use of a limitless number of machine learning models. For example, a graph representation involving four entities (a smartphone, a first application server 132, a second application server, and a network connection) may involve four different machine learning models, each corresponding to a different operation an executing in parallel. A fifth machine learning model may be configured to analyze the output of the four machine learning models.

In some cases, the machine learning module 152 may store one or more models in the data store 154. For example, the machine learning module 152 may build finite automata models for each crash category with associated navigation flow information. Each finite automata model may be updated and trained continually while the products and/or services are accessed via client system connections. Application software (e.g., the action monitor) may monitor operations of user interaction via each client system 112, 114, 116 to check the ML finite automata model for each screen/activity navigation possible, such as based on possible actions available to a user via a user interface screen, and may determine whether the next move is "SAFE" or a "CRASH". In some cases, the action monitor 156 may further identify whether a "CRASH" condition corresponds to a crash condition, an error condition, and/or an exception condition.

The action monitor 156 may analyze each predicted crash and may determine whether additional operations may be available to the user to allow the client system to perform the desired action. For example, the action monitor may determine that multiple options may be available, such as to route the next move through one or more alternative routes to the target, which do not result in a crash. In some cases, action monitor 156 may dynamically shut the next navigation. Based on the finite automata model, that was trained through one or more machine learning algorithms with past client device behavior and/or past system device behavior, the action monitor may predict the next move is SAFE or a CRASH. If alternative actions are available, the action assist module 158 may identify a "safest" navigation path to follow and may initiate a different navigation path in the background, such that at the client system 112, no difference in navigation is noticed. In some cases, if further action would be required from a client system, the action assist module may automate as much of the navigation path as possible, before prompting for user input at the client system. If no navigation path to the desired functionality is possible, the action assist module 158 may issue an error and/or may initiate secondary method to allow the desired functionality to be performed, such as by initiating an electronic messaging session to connect a user of the client system 112 with an organization's representative to assist the user in completing the desired task.

Figure 2:
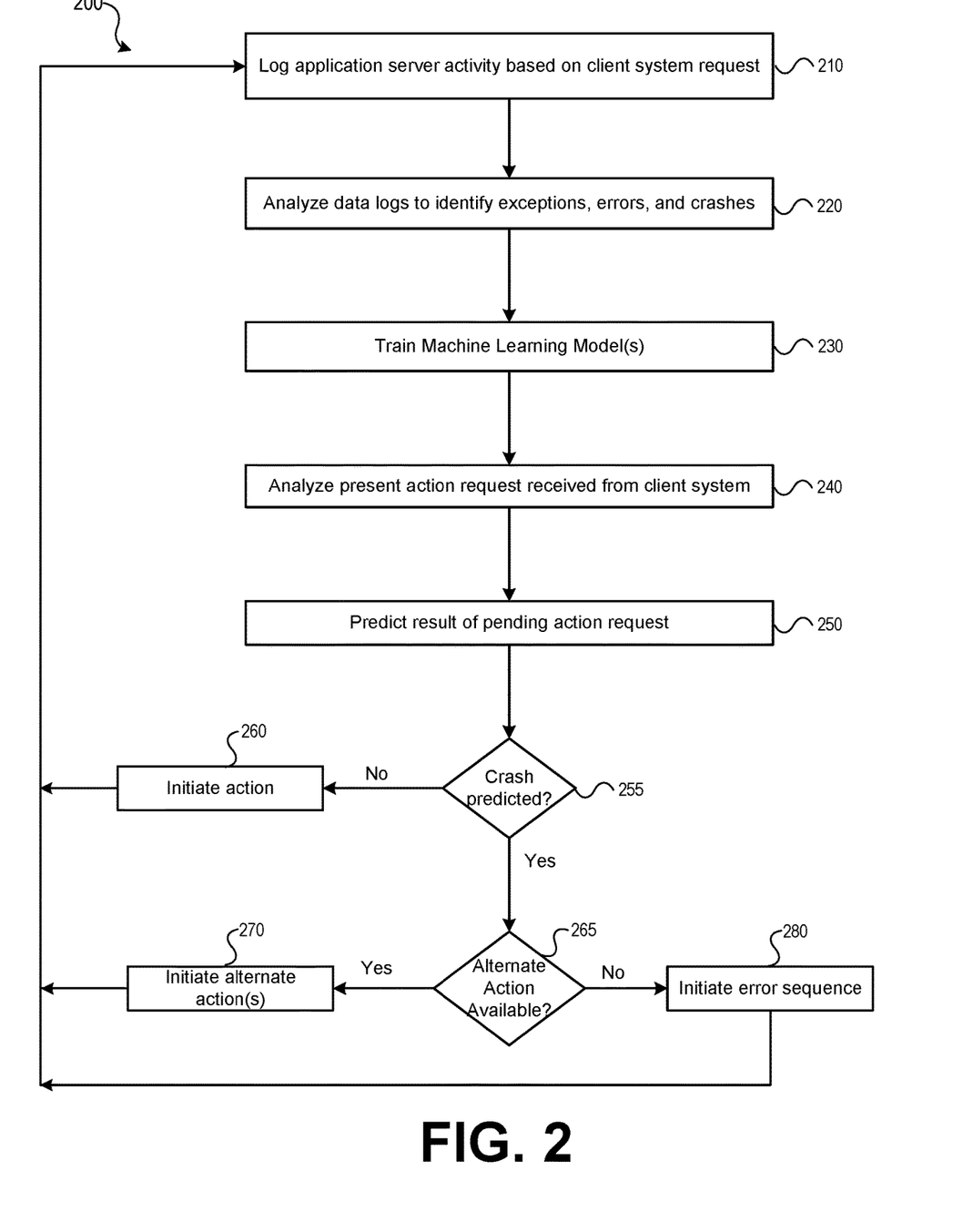
FIG. 2 shows an illustrative method performed by the crash prediction system in a computing network in accordance with aspects of this disclosure.

FIG. 2 shows an illustrative method 200 performed by the crash prediction system 150 in a computing network in accordance with aspects of this disclosure. At 210, application servers 132, 134, and 136 may log server activity information, such as error information, exception information, crash information corresponding to function calls and/or network failures experienced when performing actions based on client system requests. In some cases, client system navigation information may be logged. At 220, the machine learning module 152 of the crash prediction system 150 may analyze the data logs stored in the data store 144 to identify exceptions, errors, and/or crash conditions and the associated client system navigation information. The machine learning module 152 may then train, at 230, one or more machine learning models (e.g., finite automata models) to categorize each crash type, error type and/or exception type and may store the information in the data store 154.

At 240, the action monitor 156 may analyze a present action request received from a client system and may predict a result of the pending request at 250. If, at 255, an action is deemed safe, the action is initiated at 260. If, at 255, a crash is predicted, then the action assist module 158 may identify whether one or more alternate actions may be available at 265. If so, the action assist module may initiate an alternate action (e.g. in the background, with partial client system assistance, and the like) at 270. If, at 265, no alternate action is available to provide the desired functionality to the client system, then an error sequence may be initiated at 280. In some cases, an error sequence may include initiating an electronic messaging session to allow the desired functionality to be provided to the user via user interaction with individuals manually providing at least a portion of the desired functionality (e.g., facilitating an electronic bill pay procedure, initiating an electronic loan application procedure, and the like).

Figure 3:
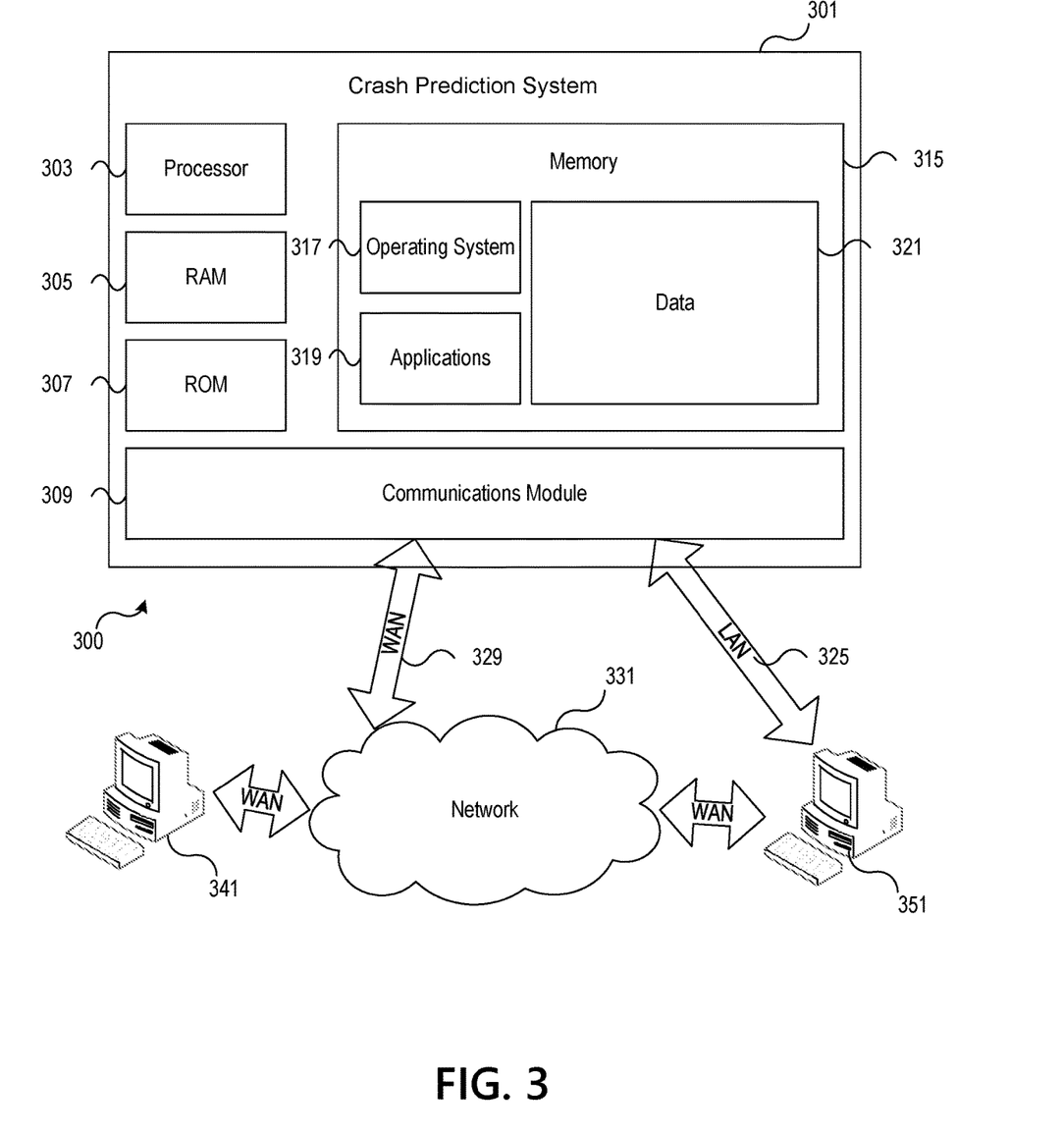
FIG. 3 shows an illustrative computing system in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative crash prediction system 301 having a processor 303 for controlling overall operation of the crash prediction system 301 and its associated components, including a Random Access Memory (RAM) 305, a Read-Only Memory (ROM) 307, a communications module 309, and a memory 315. The crash prediction system 301 may include a variety of computer readable media. Computer readable media may be any available media that may be accessed by the crash prediction system 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the crash prediction system 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the crash prediction system 301. Such a processor may execute computer-executable instructions stored on a computer-readable medium.

Software may be stored within the memory 315 and/or other digital storage to provide instructions to the processor 303 for enabling the crash prediction system 301 to perform various functions as discussed herein. For example, the memory 315 may store software used by the crash prediction system 301, such as an operating system 317, one or more application programs 319, and/or an associated database 321. In addition, some or all of the computer executable instructions for the crash prediction system 301 may be embodied in hardware or firmware. Although not shown, the RAM 305 may include one or more applications representing the application data stored in the RAM 305 while the crash prediction system 301 is on and corresponding software applications (e.g., software tasks) are running on the crash prediction system 301.

The communications module 309 may include a microphone, a keypad, a touch screen, and/or a stylus through which a user of the crash prediction system 301 may provide input, and may include one or more of a speaker for providing audio output and a video display device for providing textual, audiovisual and/or graphical output. The computing system environment 300 may also include optical scanners (not shown).

The crash prediction system 301 may operate in a networked environment supporting connections to one or more remote computing devices, such as the computing devices 341 and 351. The computing devices 341 and 351 may be personal computing devices or servers that include any or all of the elements described above relative to the crash prediction system 301.

The network connections depicted in FIG. 3 may include a Local Area Network (LAN) 325 and/or a Wide Area Network (WAN) 329, as well as other networks. When used in a LAN networking environment, the crash prediction system 301 may be connected to the LAN 325 through a network interface or adapter in the communications module 309. When used in a WAN networking environment, the crash prediction system 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
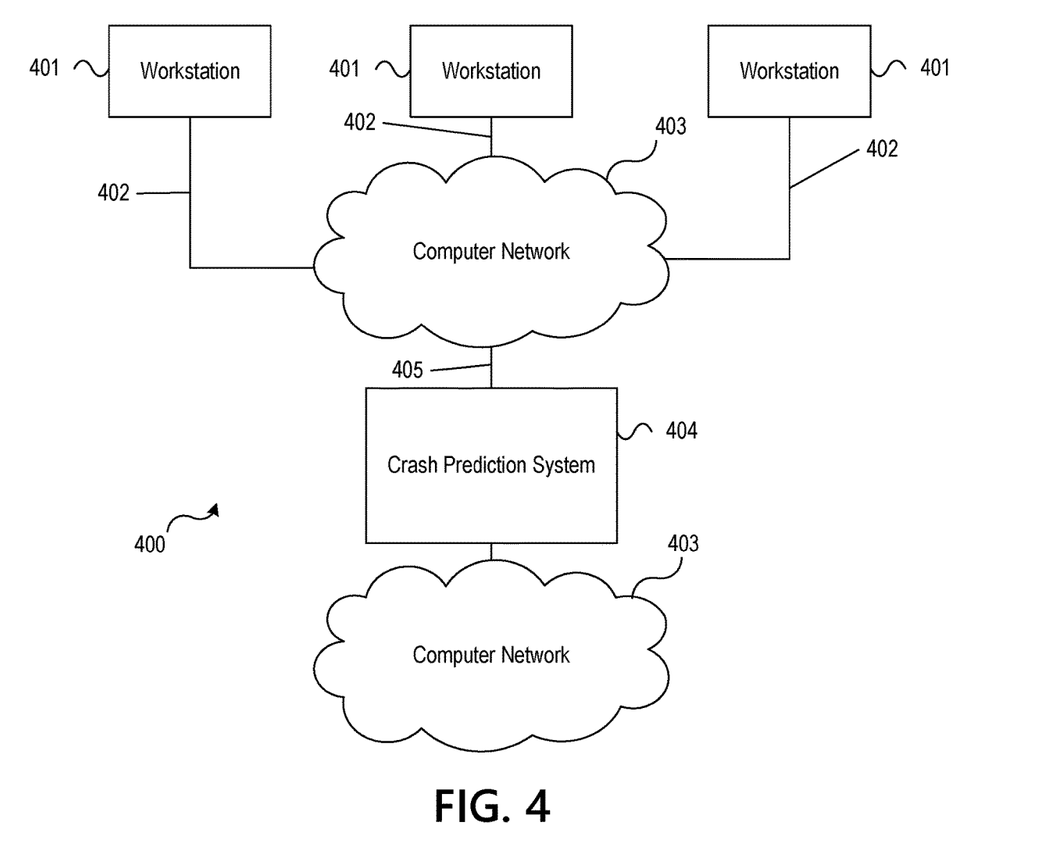
FIG. 4 shows an illustrative block diagram of workstations and servers that may be used to implement the processes and functions of certain aspects of the present disclosure in accordance with one or more aspects described herein

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to a crash prediction system 404. In the system 400, the crash prediction system 404 may be a server, processor, computer, or data processing device, or combination of the same, configured to perform the functions and/or processes described herein. The crash prediction system 404 may be used to receive check images and associated data and/or validation scores, retrieve user profile, evaluate the check image compared to the user profile, identify matching or non-matching elements, generate user interfaces, and the like.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the crash prediction system 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

One or more machine learning models may be associated with one or more devices or a class of devices (e.g., client computing system devices, application servers, and the like). Different computing devices may be involved with other entities in different ways: for example, a first computing device may access a second computing device and/or be accessed by the second computing device. As such, different machine learning models may be developed for different types of computing devices (e.g., smartphone, personal computer), different ways in which computing devices communicate (e.g., devices using cellular communications, devices using Ethernet cables), different ownership profiles of computing devices (e.g., public computers, workplace computers, personal computers located in a home), and the like.

Multiple machine learning models may be used together to make decisions. The output of one machine learning model may be used as the input of another machine learning model, and/or multiple machine learning models may execute in parallel, such that decision-making may comprise the use of a limitless number of machine learning models. For example, a graph representation involving four entities (a smartphone, a first application server 132, a second application server, and a network connection) may involve four different machine learning models, each corresponding to a different operation an executing in parallel. A fifth machine learning model may be configured to analyze the output of the four machine learning models.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An apparatus comprising:
    a processor; and
    non-transitory computer-readable media storing instructions that, when executed by the processor, cause the apparatus to:
        identify, based on monitored actions performed by an application server in response to a request received from a client computing system, a requested action to be performed by the application server;
        train a machine learning model based on customer profile data, navigation flow of a service provided by the application server as requested by the client computing system, and a current time;
        predict, by an action monitor based on the machine learning model, whether a result of the requested action would result in an invalid condition of the application server; and
        initiate, based on an indication of a predicted invalid condition of the application server, a secondary action performed by the application server, wherein a result returned to the client computing system based on performance of the secondary action conforms to an expected result of the requested action.

2. The apparatus of claim 1, wherein the requested action comprises an action performed by each of a plurality of application servers, and wherein a predicted invalid condition comprises an error with operation of a service performed by one of the plurality of application servers.

3. The apparatus of claim 1, wherein the invalid condition comprises an application error, an exception, or a crash condition experienced by a service executing on the application server.

4. The apparatus of claim 1, wherein the instructions, when executed, cause the apparatus to:
    train, based on continuous monitoring of client system interaction with a plurality of application servers, the machine learning model.

5. The apparatus of claim 1, wherein the machine learning model comprises a finite automata model trained through a machine learning algorithm based on client system operation and application server operation to predict whether a next action initiated by the client computing system would result in an expected result or an invalid operating condition of the application server.

6. The apparatus of claim 1, wherein training of the machine learning model is further based on application version information.

7. A method comprising:
    identifying, by a crash prediction computing system and based on monitored actions performed by an application server in response to a request received from a client computing system, a requested action to be performed by the application server;
    training a machine learning model based on customer profile data, navigation flow of a service provided by the application server as requested by the client computing system, and a current time;
    predicting, by an action monitor and based on the machine learning model, whether a result of the requested action would result in an invalid condition of the application server; and
    initiating, by the crash prediction computing system based on an indication of a predicted invalid condition of the application server, a secondary action performed by the application server, wherein a result returned to the client computing system based on performance of the secondary action conforms to an expected result of the requested action.

8. The method of claim 7, wherein the requested action comprises an action performed by each of a plurality of application servers, and wherein a predicted invalid condition comprises an error with operation of a service performed by one of the plurality of application servers.

9. The method of claim 7, wherein the invalid condition comprises an application error, an exception, or a crash condition experienced by a service executing on the application server.

10. The method of claim 7, further comprising training, based on continuous monitoring of client system interaction with a plurality of application servers, the machine learning model.

11. The method of claim 7, wherein the machine learning model comprises a finite automata model trained through a machine learning algorithm based on client system operation and application server operation to predict whether a next action initiated by the client computing system would result in an expected result or an invalid operating condition of the application server.

12. The method of claim 7, wherein training of the machine learning model is further based on application version information.

13. Non-transitory computer readable media storing instructions that, when executed by a processor, cause:
    identifying, by a crash prediction computing system and based on monitored actions performed by an application server in response to a request received from a client computing system, a requested action to be performed by the application server;
    training a machine learning model based on customer profile data, navigation flow of a service provided by the application server as requested by the client computing system, and a current time;
    predicting, by an action monitor and based on the machine learning model, whether a result of the requested action would result in an invalid condition of the application server; and
    initiating, by the crash prediction computing system based on an indication of a predicted invalid condition of the application server, a secondary action performed by the application server, wherein a result returned to the client computing system based on performance of the secondary action conforms to an expected result of the requested action.

14. The non-transitory computer readable media of claim 13, wherein the requested action comprises an action performed by each of a plurality of application servers, and wherein a predicted invalid condition comprises an error with operation of a service performed by one of the plurality of application servers.

15. The non-transitory computer readable media of claim 13, wherein the invalid condition comprises an application error, an exception, or a crash condition experienced by a service executing on the application server.

16. The non-transitory computer readable media of claim 13, wherein the instructions, when executed further cause training, based on continuous monitoring of client system interaction with a plurality of application servers, the machine learning model.

17. The non-transitory computer readable media of claim 13, wherein the machine learning model comprises a finite automata model trained through a machine learning algorithm based on client system operation and application server operation to predict whether a next action initiated by the client computing system would result in an expected result or an invalid operating condition of the application server.

* * * * *